(12) United States Patent
Lee

(10) Patent No.: US 8,300,196 B2
(45) Date of Patent: Oct. 30, 2012

(54) DISPLAY DEVICE HAVING FILM-CHIP COMPLEX INCLUDING A FILM HAVING A CONNECTION REGION ALONG ONE SIDE

(75) Inventor: Gyu-su Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 786 days.

(21) Appl. No.: 11/952,574

(22) Filed: Dec. 7, 2007

(65) Prior Publication Data

US 2008/0239228 A1    Oct. 2, 2008

(30) Foreign Application Priority Data

Mar. 28, 2007 (KR) .................. 10-2007-0030441

(51) Int. Cl.
*G02F 1/1345* (2006.01)
(52) U.S. Cl. ......................................... 349/150
(58) Field of Classification Search .......... 349/149–152; 345/208–210
See application file for complete search history.

(56) References Cited

U.S. PATENT DOCUMENTS

| | | | | |
|---|---|---|---|---|
| 6,278,509 | B1 * | 8/2001 | Ohga et al. ............. | 349/150 |
| 2002/0180686 | A1 | 12/2002 | Yuda et al. | |
| 2004/0095303 | A1 | 5/2004 | Moon et al. | |
| 2005/0052442 | A1 | 3/2005 | Takenaka et al. | |
| 2005/0237468 | A1 * | 10/2005 | Kim .......................... | 349/149 |
| 2006/0260977 | A1 * | 11/2006 | Lee et al. ................. | 206/709 |

FOREIGN PATENT DOCUMENTS

| | | |
|---|---|---|
| CN | 1638103 | 7/2005 |
| JP | 06043473 | 2/1994 |
| JP | 08201841 | 8/1996 |
| JP | 2000227783 | 8/2000 |
| JP | 2002169138 | 6/2002 |
| JP | 2002287655 | 10/2002 |
| JP | 2003186044 | 7/2003 |
| JP | 2004062201 | 2/2004 |
| JP | 2004133474 | 4/2004 |
| JP | 2006349889 | 12/2006 |
| KR | 1020040055343 | 6/2004 |
| KR | 1020050001248 | 1/2005 |
| KR | 1020050015803 | 2/2005 |

OTHER PUBLICATIONS

English Language Machine Translation of Kim et al. KR 10-2005-0001248 (foreign document published Jan. 6, 2005).*
Extended European Search Report for application No. 08005421.6-1228 dated Mar. 23, 2010.

* cited by examiner

*Primary Examiner* — Mark Robinson
*Assistant Examiner* — Michael Inadomi
(74) *Attorney, Agent, or Firm* — Cantor Colburn LLP

(57) ABSTRACT

A film-chip complex includes a film which includes a connection region along one side, a chip which is mounted on the film, a gate signal line which is disposed on the film, wherein the gate signal line includes a gate lead which is disposed in the connection region and a gate main line which connects the chip with the gate lead and a signal line which is disposed on the film, wherein the signal line includes a signal lead which is disposed in the connection region, a signal main line which extends substantially toward an exterior of the connection region and a signal pad which is connected with the signal main line.

10 Claims, 14 Drawing Sheets

DISPLAY DEVICE HAVING FILM-CHIP COMPLEX INCLUDING A FILM HAVING A CONNECTION REGION ALONG ONE SIDE

This application claims priority to Korean Patent Application No. 10-2007-0030441, filed on Mar. 28, 2007, and all the benefits accruing therefrom under 35 U.S.C. §119, the contents of which in its entirety are herein incorporated by reference.

BACKGROUND OF THE INVENTION

1. Field of the Invention

The present invention relates to a film-chip complex, a method of manufacturing the film-chip complex and a display device having the same.

2. Description of the Related Art

Recently, flat display devices, including a liquid crystal display ("LCD") device and an organic light emitting diode ("OLED"), have been often used.

Such display devices include a thin film transistor ("TFT") that is connected with a gate line and a data line. The gate line and the data line are insulated from each other and cross each other.

A scanning signal (e.g., a gate signal), such as a gate-on voltage and a gate-off voltage, is inputted through the gate line while a display signal (e.g., a data signal) is inputted through the data line.

The gate line is driven by a gate driver. The gate driver includes a film and a chip which is mounted on the film (e.g., a film-chip complex). The gate signal is transmitted through signal line wiring (e.g., a first wire) which is formed on a substrate and the gate driver. A common voltage may also be transmitted through signal line wiring (e.g., a second wire) which is also formed on the substrate and the gate driver.

However, as the display device increases in size, a resistance of the wiring formed therein also increases. Thus, transmission of the gate signal and/or the common voltage becomes difficult as the resistance in the wiring increases in larger sized display devices.

BRIEF SUMMARY OF THE INVENTION

An exemplary embodiment of the present invention provides a film-chip complex which efficiently transmits a signal.

An exemplary embodiment of the present invention provides a method of manufacturing a film-chip complex which efficiently transmits a signal.

An exemplary embodiment of the present invention also provides a display device which efficiently transmits a signal.

Additional aspects, features and/or advantages of the present invention will be set forth in part in the description which follows and, in part, will be obvious from the description, or may be learned by practice of the present invention.

In an exemplary embodiment of the present invention there is provided a film-chip complex including a film which includes a connection region along one side, a chip which is mounted on the film, a gate signal line which is disposed on the film, wherein the gate signal line includes a gate lead which is disposed in the connection region and a gate main line which connects the chip with the gate lead and a signal line which is disposed on the film, wherein the signal line includes a signal lead which is disposed in the connection region, a signal main line which extends substantially toward an exterior of the connection region and a signal pad which is connected with the signal main line.

According to an exemplary embodiment of the present invention, the film-chip complex may further include an insulating member which covers the gate main line and the signal main line, and the insulating member exposes the signal pad, the signal lead and the gate lead.

According to an exemplary embodiment of the present invention, the signal pad includes a larger width than a width of the signal main line.

According to an exemplary embodiment of the present invention, the signal line is connected with the chip.

According to an exemplary embodiment of the present invention, the signal line is spaced from the chip, the signal lead is provided in pairs and the gate lead is disposed between each signal lead of the pair of the signal leads.

According to an exemplary embodiment of the present invention, the chip is disposed between the signal pad and the connection region.

According to an exemplary embodiment of the present invention, the signal line includes a first signal line spaced from the chip and a second signal line connected with the chip, the signal lead of the first signal line is provided in pairs, and a gate lead of the second signal line is disposed between each signal lead of the pair of signal leads of the first signal line.

The foregoing and/or other aspects, features and advantages of the present invention can be achieved by providing a display device including a substrate which includes a gate line and a data line, the gate line intersects with and is insulated from the data line, a plurality of film-chip complexes which is attached to a first side of the substrate, and the plurality of film-chip complexes drives the gate line and a connection circuit substrate which connects at least two film-chip complexes with each other. The display device further includes a data driver which is attached to a second side of the substrate and the data driver drives the data line. A film-chip complex of the plurality of film-chip complexes includes a film, which includes a connection region, attached to the substrate, a chip which is mounted on the film, a gate signal line which is disposed on the film, the gate signal line includes a gate lead provided in the connection region and a gate main line which connects the chip with the gate lead and a signal line disposed on the film, the signal line includes a signal lead provided in the connection region, a signal main line which extends substantially toward an exterior of the connection region and a signal pad connected with the signal main line, wherein the connection circuit substrate electrically connects a signal line of respectively connected film-chip complexes of the plurality of film-chip complexes.

According to an exemplary embodiment of the present invention, the connection circuit substrate includes a substrate pad which corresponds to the signal pad, and a substrate wire which connects the substrate pads corresponding to a same signal pad.

According to an exemplary embodiment of the present invention, a plurality of signal lines is provided to be connected with the connection circuit substrate in the respectively connected film-chip complexes of the plurality of film-chip complexes, and the connection circuit substrate includes a multiple-layer circuit substrate.

According to an exemplary embodiment of the present invention, the respectively connected film-chip complexes further include an insulating member which covers the gate main line and the signal main line, and the insulating member exposes the signal pad, the signal lead and the gate lead.

According to an exemplary embodiment of the present invention, the signal pad includes a larger width than a width of the signal main line.

According to an exemplary embodiment of the present invention, the signal line is connected with the chip.

According to an exemplary embodiment of the present invention, the signal line is spaced from the chip, the signal lead is provided in pairs and the gate lead is disposed between each signal lead of the pair of signal leads.

According to an exemplary embodiment of the present invention, the chip is disposed between the signal pad and the connection region.

According to an exemplary embodiment of the present invention, the signal line includes a first signal line which is spaced from the chip, and a second signal line which is connected with the chip, the signal lead of the first signal line is provided in pairs and a gate lead of the first signal line is disposed between each signal lead of the pair of signal leads of the first signal line.

According to an exemplary embodiment of the present invention, the film-chip complexes include a connection film-chip complex which is connected with the connection circuit substrate, and a non-connection film-chip complex which is not connected with the connection circuit substrate.

According to an exemplary embodiment of the present invention, the substrate further includes a first connection wire which transmits a gate driving signal from the data driver to the plurality of film-chip complexes.

According to an exemplary embodiment of the present invention, the plurality of film-chip complexes include at least two connection film-chip complexes which are connected with the connection circuit substrate, and a non-connection film-chip complex which is not connected with the connection circuit substrate, the substrate includes a second connection wire which connects the connection film-chip complex with the non-connection film-chip complex which are adjacent to each other, and a third connection wire which connects the connection film-chip complexes which are adjacent to each other and the second connection wire includes more channels than a number of channels the third connection wire includes.

According to an exemplary embodiment of the present invention, at least one of a common voltage Vcom, a gate on voltage Von, a gate off voltage Voff, a power voltage Vdd and a ground voltage Vgnd is transmitted through the connection circuit substrate.

The foregoing and/or other aspects, features and advantages of the present invention can be achieved by providing a method of manufacturing a film-chip complex as described above.

BRIEF DESCRIPTION OF THE DRAWINGS

The above and/or other aspects, features and advantages of the present invention will now become apparent and more readily appreciated from the following description of the embodiments, taken in conjunction with the accompanying drawings, in which.

DETAILED DESCRIPTION OF THE INVENTION

Figure 1:
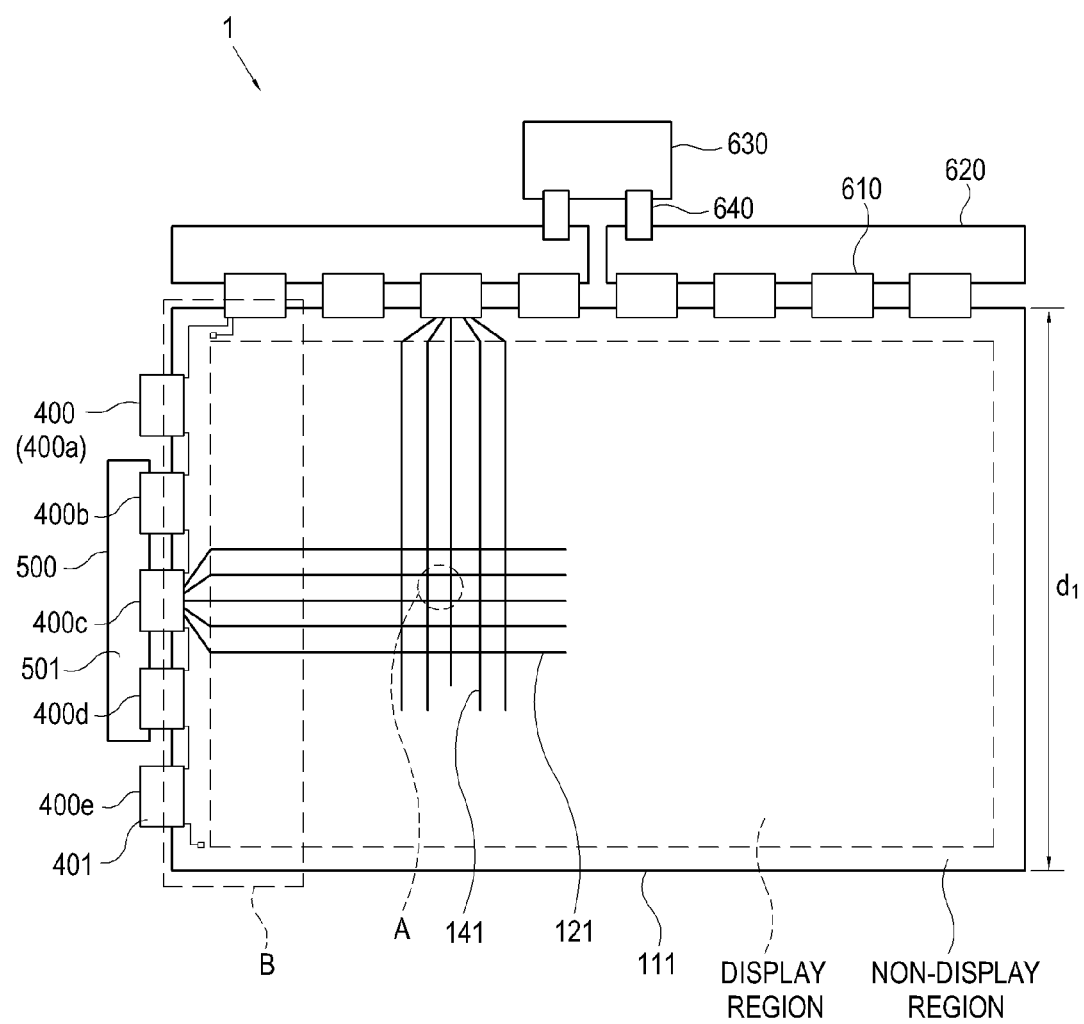
FIG. 1 illustrates a top plan schematic diagram view of an exemplary embodiment of a configuration of a first exemplary embodiment of a display device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes"and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention. Hereinafter, exemplary embodiments of the present invention will be described with reference to accompanying drawings, wherein like numerals refer to like elements and repetitive descriptions will be avoided as necessary.

A liquid crystal display ("LCD") device according to a first exemplary embodiment of the present invention will now be described with reference to FIGS. 1 to 8.

Figure 2:
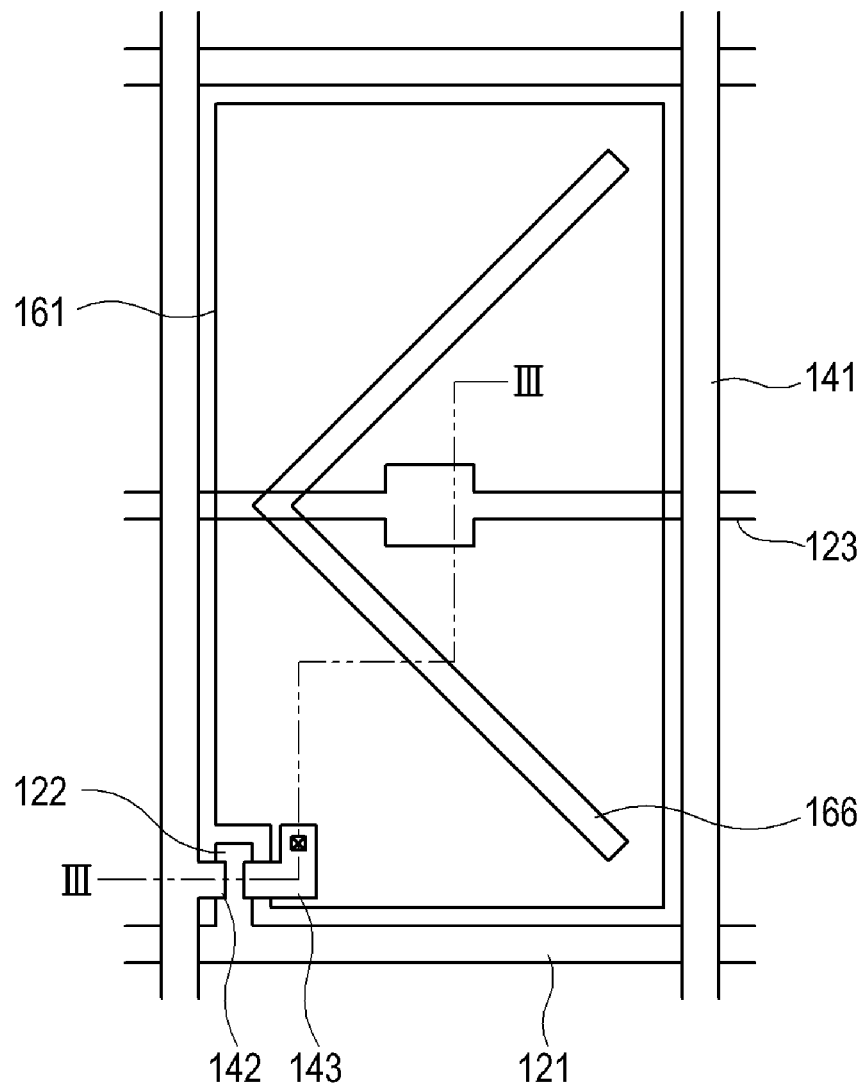
FIG. 2 is an enlarged top plan schematic diagram view of part 'A' in FIG. 1.

FIG. 1 illustrates a top plan schematic diagram view of an exemplary embodiment of a configuration of a first exemplary embodiment of a display device 1 according to the present invention. FIG. 2 is an enlarged top plan schematic diagram view of part 'A' in FIG. 1 and FIG. 3 is a cross-sectional schematic diagram view taken along line III-III in FIG. 2.

Figure 3:
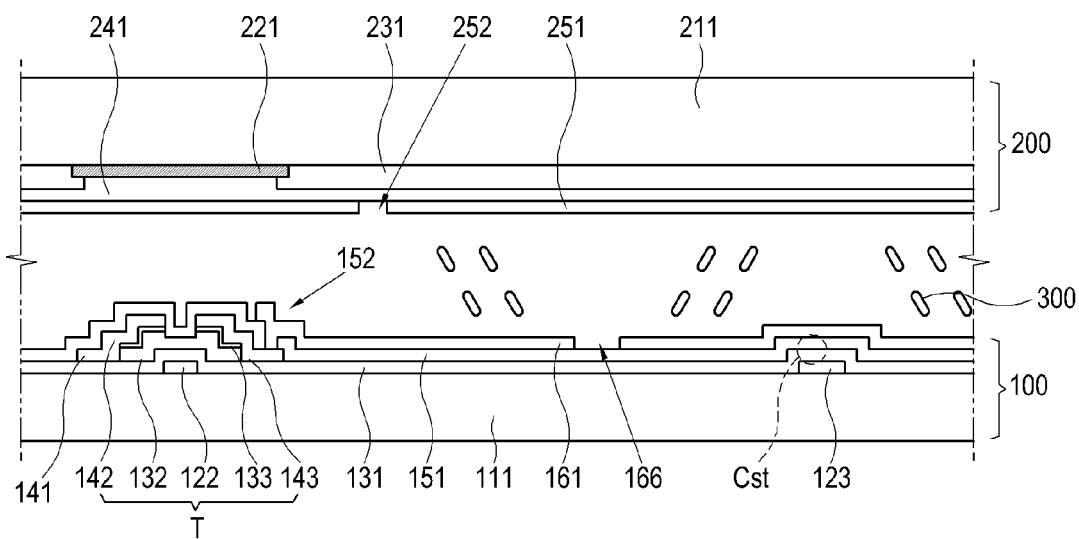
FIG. 3 is a cross-sectional schematic diagram view taken along line III-III in FIG. 2.

As shown in FIGS. 1 and 3, an LCD device 1 includes a first substrate 100, a second substrate 200, a liquid crystal layer 300 interposed between the first and second substrates 100 and 200, a plurality of gate drivers 400 (e.g., a film-chip complex) attached to a left side or an outer region of the first substrate 100, a plurality of data drivers 610 provided along an upper side or an outer region of the first substrate 100, a data circuit substrate 620 connected with the plurality of data drivers 610 and a control circuit substrate 630.

A flexible member 640 connects the control circuit substrate 630 with the data circuit substrate 620.

In the current exemplary embodiment, there are five gate drivers 400. The gate drivers 400 include three connection gate drivers 400b, 400c and 400d which are disposed in a center or a central portion of the five gate drivers 400. The three connection gate drivers 400b, 400c and 400d are connected with a connection circuit substrate 500. The gate drivers 400 also include two non-connection gate drivers 400a and 400e which are provided in an external boundary portion of the five gate drivers 400, and the gate drivers 400a and 400e are not connected with the connection circuit substrate 500.

Referring to FIGS. 1-3, a display region of the first substrate 100 will now be described.

Gate wires 121, 122 and 123 are formed on a first insulating substrate 111. In exemplary embodiments, the gate wires 121, 122 and 123 may include a single metal layer or multiple metal layers. The gate wires 121, 122 and 123 include a gate line 121 which is formed in the display region and extends substantially transversely with respect to the display region, a gate electrode 122 which is connected with the gate line 121, and a storage electrode line 123 which extends substantially in parallel with the gate line 121.

Figure 4:
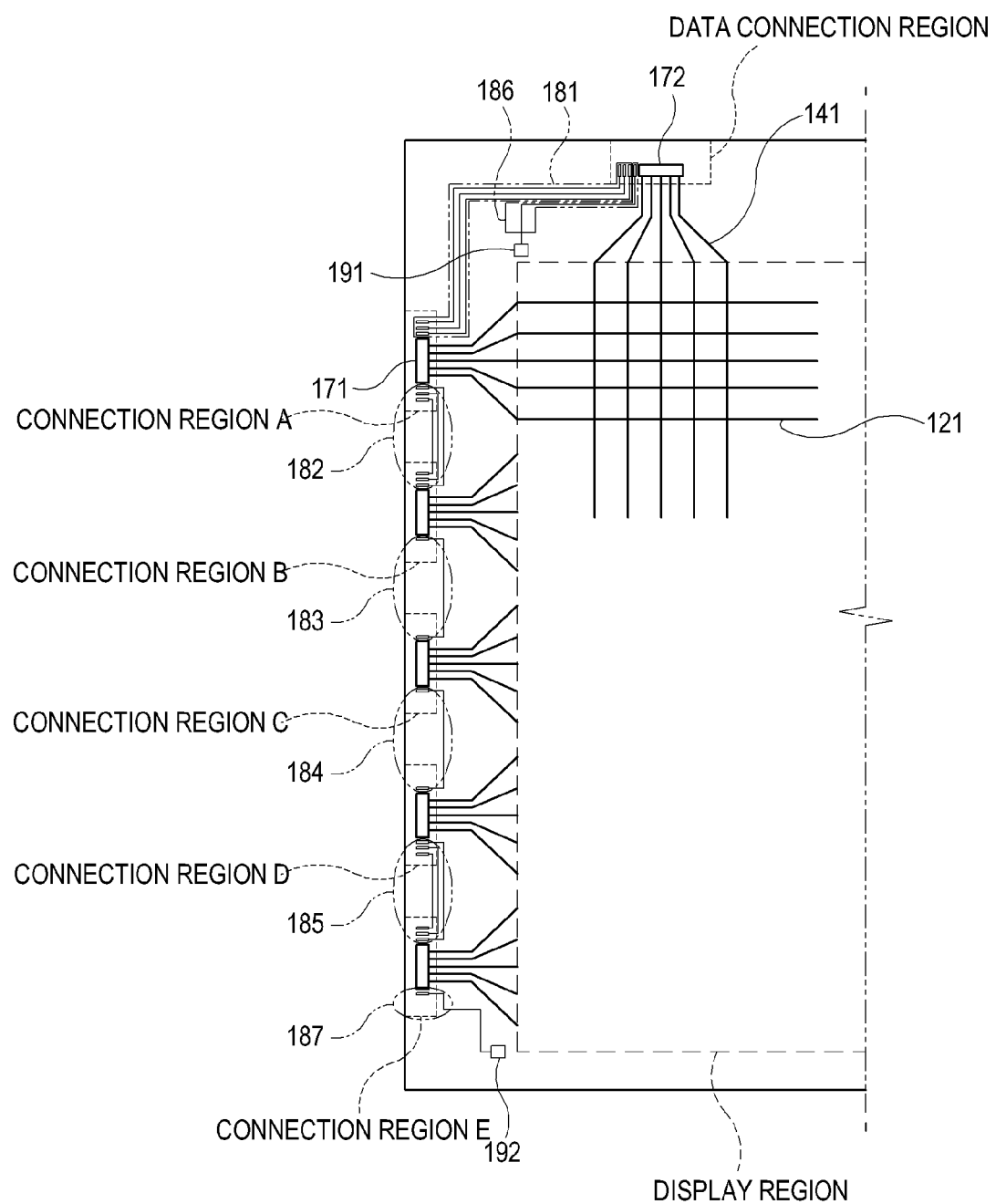
FIG. 4 is an enlarged top plan schematic diagram view of part 'B' in FIG. 1.

An end part of each gate line 121 is connected with the gate drivers 400 through a gate pad 171 (refer to FIG. 4). The gate line 121 receives a gate signal, e.g., a gate-on voltage and a gate-off voltage, through the gate drivers 400.

A gate insulating layer 131 covers the gate wires 121, 122 and 123 which are disposed on the first insulating substrate 111. In an exemplary embodiment, the gate insulating layer 131 includes silicon nitride ("SiNx").

A semiconductor layer 132 is formed on a portion of the gate insulating layer 131 which is disposed on the gate electrode 122. In an exemplary embodiment, the semiconductor layer 132 includes amorphous silicon ("a-Si"). An ohmic contact layer 133 including an n+hydrogenated amorphous silicon heavily doped with an n-type dopant is formed on the semiconductor layer 132. A portion of the ohmic contact layer 133 is removed from a channel region between a source electrode 142 and a drain electrode 143.

Data wires 141, 142 and 143 are formed on the ohmic contact layer 133 and the gate insulating layer 131. In exemplary embodiments, the data wires 141, 142 and 143 may also include a single metal layer or multiple metal layers. The data wires 141, 142 and 143 include a data line 141 which is formed substantially vertical with respect to the first insulating substrate 111, as illustrated in the top plan view of FIG. 1, and the data line 141 intersects with the gate line 121. The data wires 141, 142 and 143 include the source electrode 142 which is branched from the data line 141 and which extends over the ohmic contact layer 133 and the drain electrode 143. The drain electrode 143 is separated from the source electrode 142 and is partly formed on the ohmic contact layer 133.

In an exemplary embodiment, the intersection of the data line 141 and the gate line 121 forms a pixel.

An end part of each data line 141 is connected with the data drivers 610 through a data pad 172 (refer to FIG. 4). The data line 141 receives a data voltage through the data drivers 610. In exemplary embodiments, the data drivers 610 may also include a film-chip complex, similar to the gate drivers 400.

A passivation layer 151 is formed on the data wires 141, 142 and 143 and on a portion of the semiconductor layer 132 which is not covered by the data wires 141, 142 and 143. A contact hole 152 is formed on the passivation layer 151 in order to expose the drain electrode 143 therethrough.

A pixel electrode 161 is formed on the passivation layer 151. In exemplary embodiments, the pixel electrode 161 includes a transparent conductive material such as indium tin oxide ("ITO"), indium zinc oxide ("IZO"), etc. The pixel electrode 161 is connected with the drain electrode 143 through the contact hole 152. The pixel electrode 161 includes a pixel electrode cutting pattern 166.

The pixel electrode cutting pattern 166 of the pixel electrode 161 and a common electrode cutting pattern 252 (to be described below) divide the liquid crystal layer 300 into a plurality of regions.

Referring to FIGS. 1 and 4, a non-display region of the first substrate 100 will now be described. FIG. 4 is an enlarged top plan schematic diagram view of part 'B' in FIG. 1.

A data connection region, which is connected with the data drivers 610, is formed on an upper part or an outer portion of the non-display region. The data pad 172 is formed in the data connection region and is connected with the data line 141. A part of a first connection wire 181 and a part of a first common voltage wire 186 are also formed in the data connection region.

Although FIG. 4 illustrates a single data pad 172, a data pad 172 is provided for each data line 141.

A connection region, which is connected with the gate driver 400, is formed on a left side or an outer region of the non-display region. In the current exemplary embodiment, there are five connection regions a, b, c, d and e which are to be respectively connected with the gate drivers 400a, 400b, 400c, 400d and 400e.

The gate pads 171, which are connected with the gate lines 121, are formed in the respective connection regions a to e, and a part of the connection wires 181 to 185 and a second common voltage wire 187 are also formed in the respective connection regions a to e.

Although FIG. 4 illustrates a single gate pad 171, a gate pad 171 is provided for each gate line 121.

Hereinafter, the connection wires 181 to 185 and the common voltage wires 186 and 187 will now be further described.

The first connection wire 181 connects the data connection region with the connection region a, and the first connection wire 181 includes three channels.

The second connection wire 182 connects the connection region a with the connection region b, and the second connection wire 182 includes three channels. In the current exemplary embodiment, the connection region a is connected with the first gate driver 400a, while the connection region b is connected with the second gate driver 400b.

The third connection wire 183 connects the connection region b with the connection region c, and the third connection wire 183 includes a single channel. In the current exemplary embodiment, the connection region b is connected with the second gate driver 400b, while the connection region c is connected with the third gate driver 400c.

The fourth connection wire 184 connects the connection region c with the connection region d, and the fourth connection wire 184 includes a single channel. In the current exemplary embodiment, the connection region c is connected with the third gate driver 400c, while the connection region d is connected with the fourth gate driver 400d.

The fifth connection wire 185 connects the connection region d with the connection region e, and the fifth connection wire 185 includes three channels. In the current exemplary embodiment, the connection region d is connected with the fourth gate driver 400d, while the connection region e is connected with the fifth gate driver 400e.

As described above, a number of channels included in the connection wires 183 and 184 connecting the connection gate drivers 400b, 400c and 400d with each other is less than a number of channels included in the connection wires 182 and 185 connecting the connection gate drivers 400b and 400d with the non-connection gate drivers 400a and 400d.

According to another exemplary embodiment, the number of channels included in each of the connection wires 181 to 185 may be equal to each other. However, in exemplary embodiments, a number of actually used channels and the number of channels included in the connection wires 181 to 185 may be different. The expressions "includes a greater number of channels" or "includes a fewer number of channels" in the present invention include a case in which the number of actually used channels within the connection wires 181 to 185 is different than the number of channels included in the connection wires 181 to 185.

As illustrated in FIG. 4, in an exemplary embodiment, a first common voltage pad 191 is formed in an upper left side of the non-display region, while a second common voltage pad 192 is formed in a lower left side of the non-display region. However, the present invention is not limited to the abovementioned locations in which the common voltage pad 191 and the second common voltage pad 192 may be formed.

The first common voltage wire 186 is connected with the first common voltage pad 191, and the second common voltage wire 187 is connected with the second common voltage pad 192.

The common voltage which is transmitted to the common voltage pads 191 and 192 is supplied to the common electrode 251 of the second substrate 200 through a short member (not shown), which includes a metal. In exemplary embodiments, the common electrode 251 receives the common voltage from lower left and lower right sides of the non-display region, and thereby makes an applied voltage to the common electrode 251 uniform. That is, the common electrode 251 receives the common voltage from several points.

The common voltage is supplied to the second common voltage pad 192 through the gate drivers 400, which will be described later in detail.

Referring to FIGS. 2 and 3, the second substrate 200 will now be further described.

A black matrix 221 is formed on a second insulating substrate 211. The black matrix 221 is disposed between red, green and blue filters, and the black matrix 221 blocks light from being directly emitted to the thin film transistor ("TFT") of the first substrate 100. In exemplary embodiments, the black matrix 221 includes a photoresist organic material to which a black pigment is added. In exemplary embodiments, the black pigment may include carbon black or titanium oxide.

A color filter 231 includes red, green and blue filters which are repeatedly formed between the black matrixes 221. The color filter 231 assigns color to light which is emitted from a backlight unit (not shown) and which passes through the liquid crystal layer 300. In exemplary embodiments, the color filter 231 includes a photoresist organic material.

An overcoat layer 241 is formed on the color filter 231 and on portions of the black matrixes 221 which are not covered by the color filter 231. The overcoat layer 241 provides a planar surface and protects the color filter 231. In exemplary embodiments, the overcoat layer 241 may include a photoresist acrylic resin.

The common electrode 251 is formed on the overcoat layer 241. In exemplary embodiments, the common electrode 251 includes a transparent conductive material such as indium tin oxide ("ITO"), indium zinc oxide ("IZO"), etc. The common electrode 251 of the second substrate 200 and the pixel electrode 161 of the first substrate directly supply a voltage to the liquid crystal layer 300.

The common electrode cutting pattern 252 is formed in the common electrode 251. The common electrode cutting pattern 252 and the pixel electrode cutting pattern 166 divide the liquid crystal layer 300 into a plurality of regions.

However, the pixel electrode cutting pattern 166 and the common electrode cutting pattern 252 are not limited to those patterns illustrated in the current exemplary embodiment. In alternative exemplary embodiments, the pixel electrode cutting pattern 166 and the common electrode cutting pattern 252 may be formed in various shapes. According to another exemplary embodiment, a projection may be provided instead of the cutting patterns 166 and 252, in order to divide the liquid crystal layer 300 into a plurality of regions.

The liquid crystal layer 300 is disposed between the first and second substrates 100 and 200. The liquid crystal layer 300 has a vertically aligned ("VA") mode in which a lengthwise direction of liquid crystal molecules is substantially perpendicular to the liquid crystal layer 300 when not receiving a voltage. However, when a voltage is supplied, the liquid crystal molecules lie substantially vertical with respect to an electric field, due to a negative dielectric anisotropy of the liquid crystal molecules.

In exemplary embodiments, when the pixel electrode cutting pattern 166 and the common electrode cutting pattern 252 are not formed, the liquid crystal molecules are irregularly arranged since the lying direction of the liquid crystal molecules is not pre-determined, thereby creating a disclination line on a boundary between different lying directions. The pixel electrode cutting pattern 166 and the common electrode cutting pattern 252 form a fringe field and thereby determine the lying direction of the liquid crystal molecules when the voltage is supplied to the liquid crystal layer 300. The liquid crystal layer 300 is divided into a plurality of regions according to an arrangement of the pixel electrode cutting pattern 166 and the common electrode cutting pattern 252.

The LCD device 1 according to the first exemplary embodiment has a patterned vertical alignment ("PVA") mode, however the present invention is not limited thereto.

Figure 5:
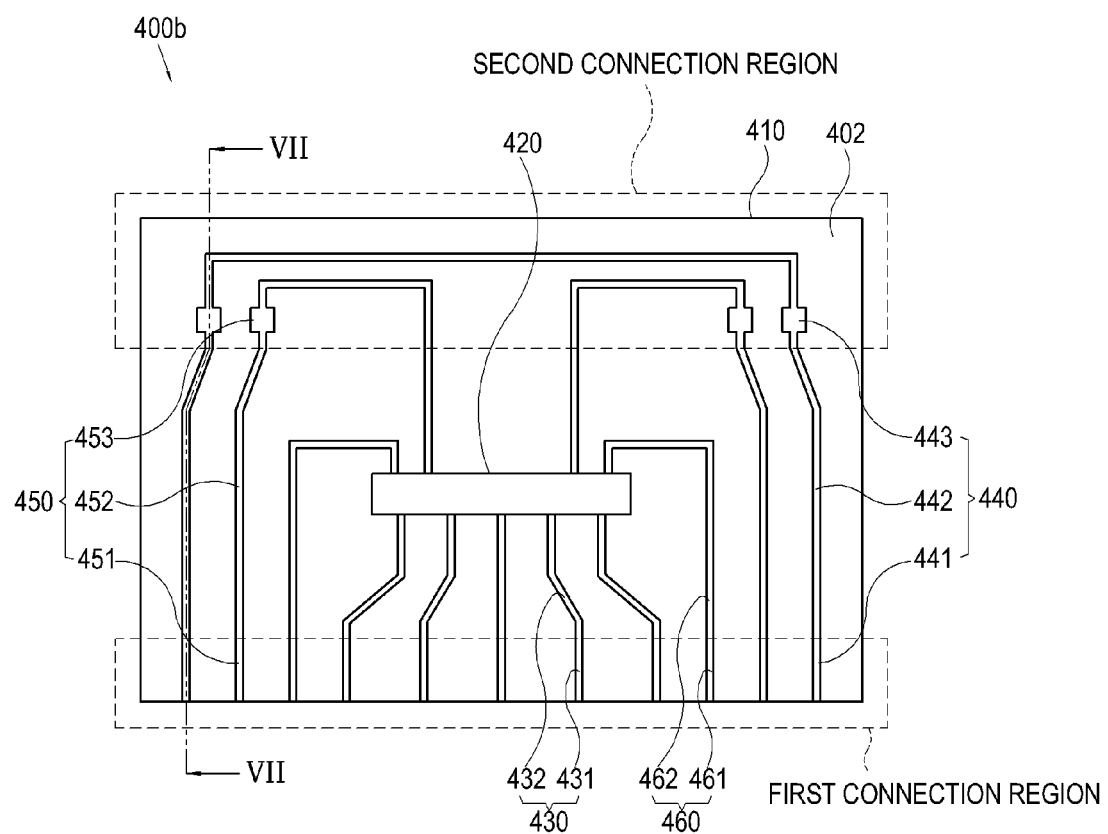
FIG. 5 illustrates a top plan schematic diagram view of an exemplary embodiment of a second surface of a gate driver of the first exemplary embodiment of a display device according to the present invention.

Referring to FIGS. 1 and 5, the gate drivers 400 will now be further described.

FIG. 5 illustrates a top plan schematic diagram view of an exemplary embodiment of a second surface 402 of a gate driver 400 of the first exemplary embodiment of a display device 1 according to the present invention.

FIG. 5 only illustrates the second gate driver 400b, however the respective gate drivers 400a to 400e include a same configuration, and therefore a detailed description of the gate drivers 400a, 400c, 400d and 400e will be omitted in order to avoid redundancy.

Figure 7:
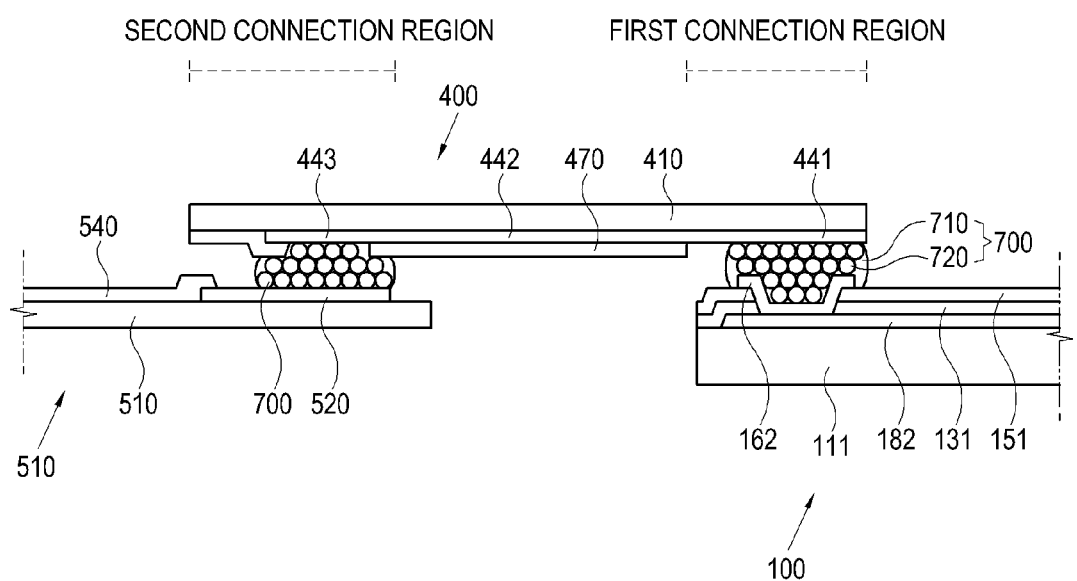
FIG. 7 is a cross-sectional schematic diagram view taken along line VII-VII in FIG. 5.

The gate drivers 400 include a film 410, a chip 420, which is mounted on the film 410, a gate signal line 430, signal lines 440, 450 and 460 and an insulating member 470 (refer to FIG. 7).

An additional pattern is not formed on a first surface 401 of the gate drivers 400. The chip 420, the gate signal line 430, the signal lines 440, 450 and 460 and the insulating member 470 are formed on a second surface 402 of the gate drivers 400.

Referring to FIG. 5, the gate drivers 400 include a first connection region which is formed along a lower side and is connected with the first substrate 100, and a second connection region which is formed along an upper side and is connected with the connection circuit substrate 500. The chip 420 is disposed between the first and second connection regions.

The gate signal line 430 includes a gate lead 431 and a gate main line 432. The gate lead 431 is provided in the first connection region and is connected with the gate pad 171. The gate lead 431 is exposed to an external environment instead of being covered by the insulating member 470. As shown in FIG. 5, the gate main line 432 connects the gate lead 431 with the chip 420. The gate main line 432 is covered with the insulating member 470.

The signal lines 440, 450 and 460 are disposed in a vicinity of the gate signal line 430, and the signal lines 440, 450 and 460 are connected with the connection wires 181 to 185 and with the second common voltage wire 187 of the first substrate 100. Depending on an attachment position of each gate driver 400, a specific part among the connection wires 181 to 185 and the second common voltage wire 187 which are to be connected to the gate drivers 400 is determined for each gate driver 400.

The first signal line 440 includes a signal lead 441, a signal main line 442 and a signal pad 443.

The signal lead 441 is provided in the first connection region and is exposed to the external environment. The signal lead 441 is provided in pairs, wherein the gate signal line 430 is disposed between each signal lead 441. The signal main line 442 is spaced apart from the chip 420 and is formed around the chip 420. The signal main line 442 connects each signal lead 441 of the pair of signal leads 441 with each other. The signal pad 443 is provided in the second connection region, and the signal pad 443 includes a larger width than a width of signal main line 442. The signal pad 443 is exposed to the external environment.

The common voltage which is supplied to the common electrode 251 is transmitted through the first signal line 440. According to another exemplary embodiment, a lower substrate common voltage which is supplied to the storage electrode line 123 may be transmitted through the first signal line 440.

The second signal line 450 includes a signal lead 451, a signal main line 452 and a signal pad 453.

The signal lead 451 is provided in the first connection region, and the signal lead 451 is exposed to the external environment. The signal lead 451 is provided in pairs, wherein the gate signal line 430 is disposed between each signal lead 451. The signal main line 452 is connected with the chip 420, and the signal main line 452 is also provided in pairs. The signal pad 453 is provided in the second connection region, and the signal pad 453 includes a width larger than a width of the signal main line 452. The signal pad 453 is exposed to the external environment.

A gate-on voltage Von and/or a gate-off voltage Voff are transmitted through the second signal line 450.

According to another exemplary embodiment, a power voltage Vdd and a ground voltage Vgnd may be transmitted through the first and second signal lines 440 and 450.

The third signal line 460 includes a signal lead 461 and a signal main line 462.

The signal lead 461 is provided in the first connection region, and the signal lead 461 is exposed to the external environment. The signal lead 461 is provided in pairs, wherein the gate signal line 430 is disposed between each signal lead 461. The signal main line 462 is connected with the chip 420, and the signal main line 462 is also provided in pairs.

A first clock signal CKV, a second clock signal CKVB and a scanning starting signal STVP are supplied through the third signal line 460.

Figure 6:
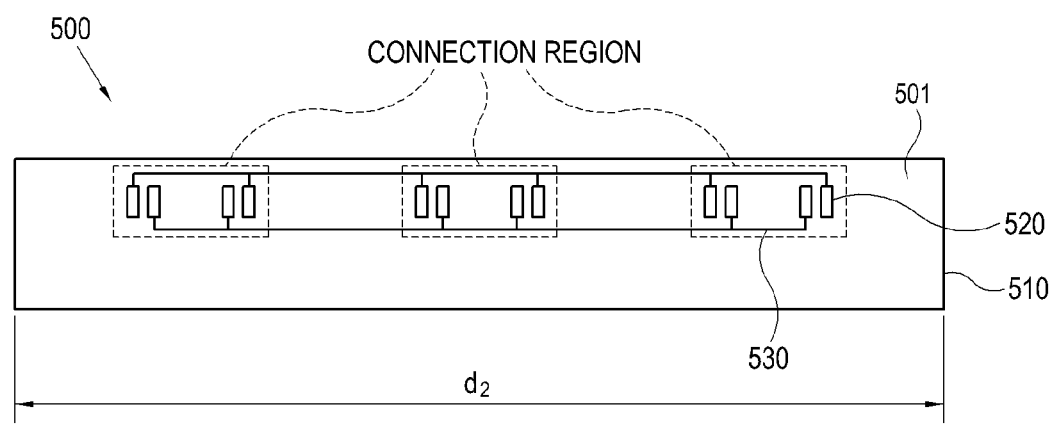
FIG. 6 illustrates a top plan schematic diagram view of an exemplary embodiment of a first surface of a connection circuit substrate of the first exemplary embodiment of a display device according to the present invention.

Referring to FIGS. 1 and 6, the connection circuit substrate 500 will now be further described. FIG. 6 illustrates a top plan schematic diagram view of an exemplary embodiment of a first surface 501 of a connection circuit substrate 500 of the first exemplary embodiment of a display device 1 according to the present invention;

The connection circuit substrate 500 includes a substrate main body 510, a substrate pad 520 and a substrate wire 530. The substrate pad 520 and the substrate wire 530 are provided in a first surface 501 of the connection circuit substrate 500.

Each of the respective connection regions includes four substrate pads 520, and the substrate pads 520 are connected with one of the connection gate drivers 400b, 400c and 400d.

The substrate pads 520 are connected with the signal pads 443 and 453 of the gate driver 400, while the substrate wire 530 connects the substrate pads 520 which are connected to a same signal pad 443 and 453, with each other. That is, the substrate wire 530 connects the substrate pads 520, which are connected to the signal pads 443, to each other. Similarly, the substrate wire 530 connects the substrate pads 520, which are connected to the signal pads 453, to each other.

According to another exemplary embodiment, the connection circuit substrate 500 may be connected with the gate drivers 400 which are adjacent to the data drivers 610. In an exemplary embodiment, the connection circuit substrate 500 is connected with the three gate drivers 400a, 400b and 400c which are adjacent to the data drivers 610.

FIG. 7 illustrates a cross-sectional schematic diagram view of a connection between the gate drivers 400 and the first substrate 100, and a connection between the gate drivers 400 and the connection circuit substrate 500.

The signal lead 441 of the second gate driver 400b is connected with the second connection wire 182 of the first substrate 100 through an anisotropic conductive film 700. The second connection wire 182 is covered with a transparent conductive layer 162.

The anisotropic conductive film 700 includes a base resin 710 and a conductive ball 720. The conductive balls 720 contact each other and electrically connect the signal lead 441 with the transparent conductive layer 162.

Although not shown in FIG. 7, the anisotropic conductive film 700 connects other signal leads 451 and 461 with the signal wires 182 and 183, and also connects the gate lead 431 with the gate pad 171.

The signal pad 443 of the gate driver 400 is connected with the substrate pad 520 of the connection circuit substrate 500 through the anisotropic conductive film 700. A vicinity of the substrate pad 520 in the connection circuit substrate 500 is covered with a substrate insulating member 540.

As described above, according to the current exemplary embodiment of the present invention, the signal pads 443 and 453 are provided in the gate drivers 400, and the signal pads 443 and 453 are connected to each other, respectively, through the connection circuit substrate 500. That is, for example, the signal pads 443 in the gate drivers 400 are connected to each other through the connection substrate 500. Similarly, the signal pads 453 in the gate drivers 400 are connected to each other through the connection substrate 500. The connection circuit substrate 500 is connected with a part of the gate drivers 400. A reason why the connection circuit substrate 500 is partly connected with the gate drivers 400 will now be further described with reference to FIGS. 1 and 8.

Figure 8:
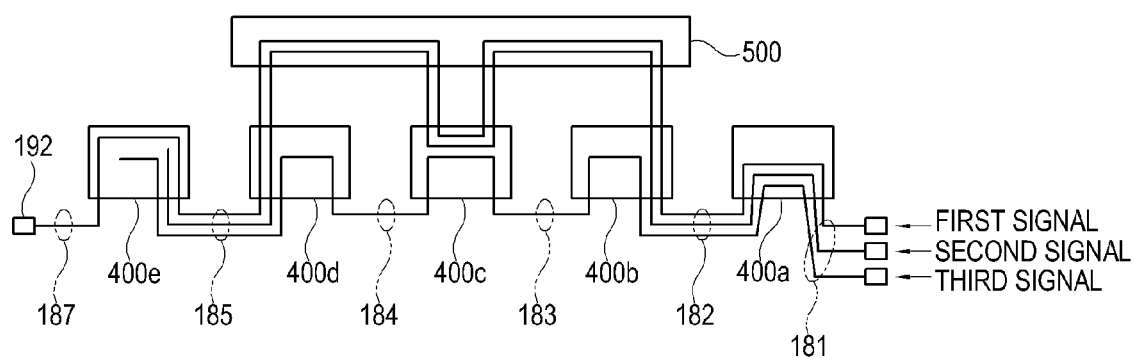
FIG. 8 illustrates a top plan schematic diagram view of an exemplary embodiment of a signal transmission path of the first exemplary embodiment of a display device according to the present invention.

FIG. 8 illustrates a top plan schematic diagram view of an exemplary embodiment of a signal transmission path of the first exemplary embodiment of a display device 1 according to the present invention.

As shown in FIG. 8, a first signal such as the common voltage is transmitted to the second common voltage pad 192 through the first connection wire 181, the first gate driver 400a, the second connection wire 182, the second gate driver 400b, the connection circuit substrate 500, the fourth gate driver 400d, the fifth connection wire 185 and the second common voltage wire 187. That is, the common voltage is transmitted through the connection circuit substrate 500 which is connected with the connection gate drivers 400b, 400c and 400d.

A second signal such as the gate-on voltage and the gate-off voltage is transmitted to the fifth gate driver 400e through the same route as the first signal described above. That is, the gate-on voltage and/or the gate-off voltage are transmitted through the connection circuit substrate 500 which is connected with the connection gate drivers 400b, 400c and 400e.

Meanwhile, a third signal is transmitted to the fifth gate driver 400e through all of the connection wires 181 to 185 and through the gate drivers 400a to 400e.

A width and a thickness of the connection wires 181 to 185 which are formed in the first substrate 100 are limited, thereby having a relatively large resistance. Meanwhile, a width and a thickness of the substrate wire 530 which are formed in the connection circuit substrate 500 are less limited, thereby having a relatively lower resistance as compared to connection wires 181 to 185.

The first and second signals are transmitted to the fifth gate driver 400e through the substrate wire 530 which has a relatively low resistance, with a low resistive loss. Thus, the common voltage is efficiently supplied to the second common voltage pad 192, thereby maintaining the common voltage uniform across the display region.

Also, the gate-on voltage and the gate-off voltage are efficiently supplied to the fifth gate driver 400e, to thereby stably drive the gate line 121.

As a size of the display device 1 increases, a width d1 (refer to FIG. 1) thereof also increases. As the width d1 increases, transmission of a signal without resistive loss to the lower left side of the non-display region, which is disposed at a distance away from the data drivers 610, is difficult. However, according to the current exemplary embodiment of the present invention, a signal may be efficiently supplied to the lower left side of the non-display region by using the connection circuit substrate 500.

According to the current exemplary embodiment of the present invention, the connection circuit substrate 500 is partially connected with the gate drivers 400. If the connection circuit substrate 500 is connected with all of the gate drivers 400, a production of the connection circuit substrate 500 becomes difficult and production costs thereof increase, since a length d2 (refer to FIG. 6) of the connection circuit substrate 500 increases as the width d1 of the display device 1 increases.

According to the current exemplary embodiment of the present invention, the connection circuit substrate 500 is connected with a part of the gate drivers 400, and the gate drivers 400 limit an increase in the length d2 of the connection circuit substrate 500. In exemplary embodiments, a number of the gate drivers 400 which are connected with the connection circuit substrate 500 may be determined as a minimum number of gate drivers 400 required so that signals are transmitted to the lower left side of the non-display region at a desirable level.

Although the connection between the connection circuit substrate 500 and the number of used channels depend on the position of the gate drivers 400, all of the gate drivers 400 have a substantially similar form. Thus, since one type of gate driver 400 is used, the gate drivers 400 are easily managed and a production process thereof is thereby simplified.

According to the current exemplary embodiment of the present invention, the signal which is transmitted through the connection circuit substrate 500 primarily includes a signal having a large loss due to resistance, if the signal passes through the first substrate 100. In alternative exemplary embodiments, the signal transmitted through the connection circuit substrate 500 may vary.

Hereinafter, a gate driver according to a second exemplary embodiment of the present invention will now be described.

Figure 9:
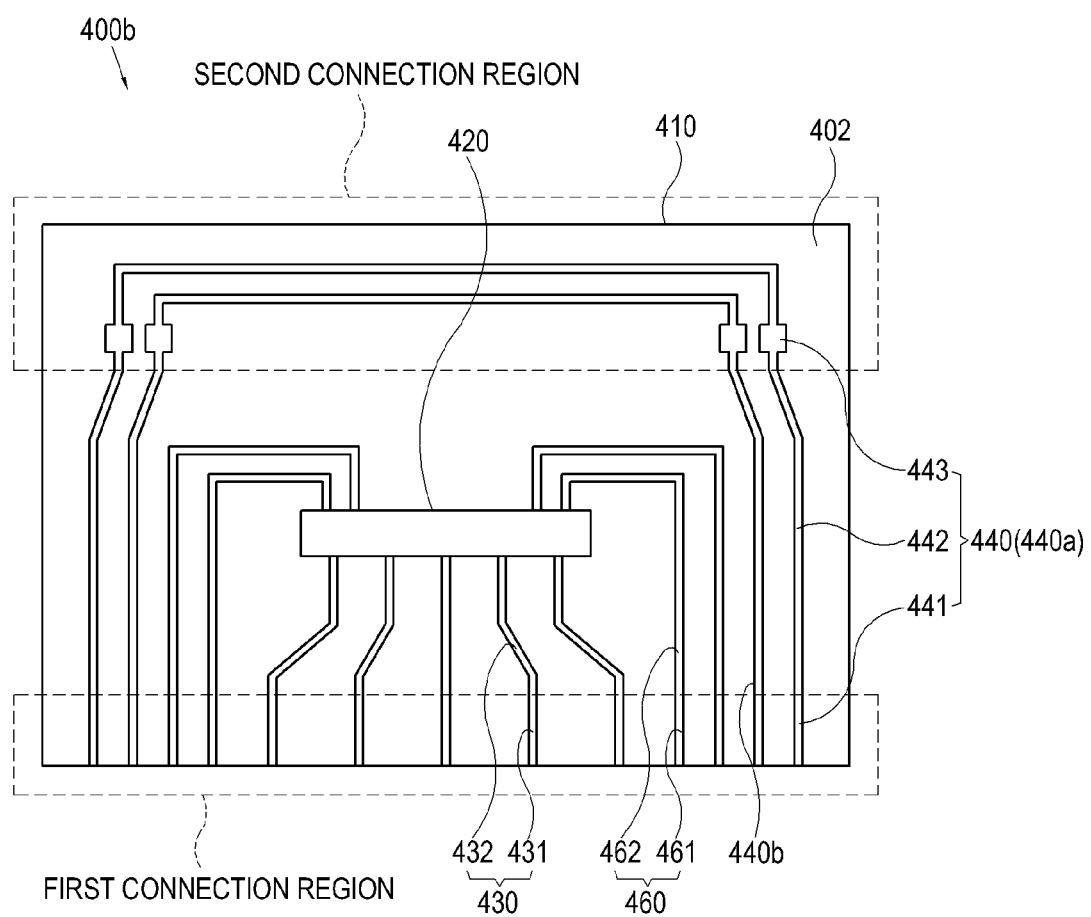
FIG. 9 illustrates a top plan schematic diagram view of a second surface of another exemplary embodiment of a gate driver of a second exemplary embodiment of a display device according to the present invention.

FIG. 9 illustrates a top plan schematic diagram view of a second surface 402 of another exemplary embodiment of a gate driver 400 of a second exemplary embodiment of a display device 1 according to the present invention;

As shown in FIG. 9, a pair of first signal lines 440 is provided. In an exemplary embodiment, one signal line 440a of the pair of first signal lines 440 may transmit a common voltage which is to be supplied to a common electrode 251, while the other signal line 440b of the pair of first signal lines 440 may transmit a lower substrate common voltage.

According to another exemplary embodiment, a gate-on voltage Von, a gate-off voltage Voff, a power voltage Vdd or a ground voltage Vgnd may be transmitted through the first signal line 440.

Figure 10:
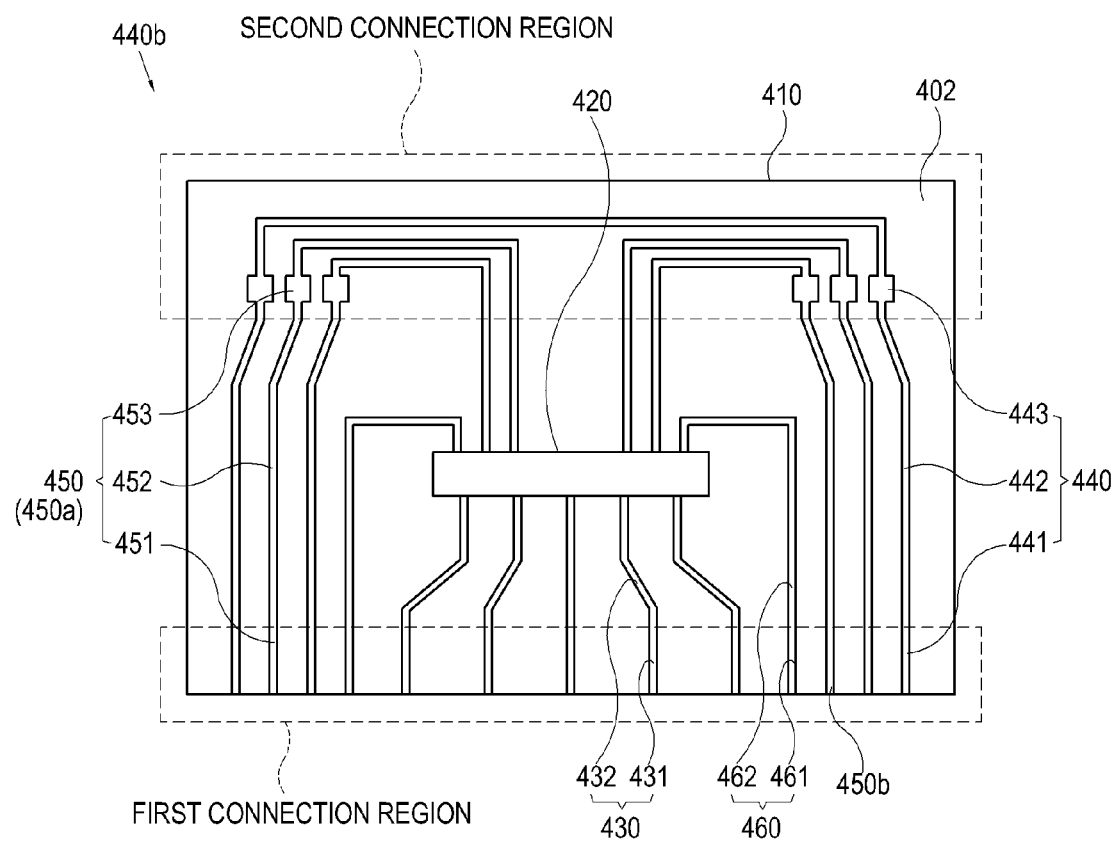
FIG. 10 illustrates a top plan schematic diagram of view of a second surface of another exemplary embodiment of a gate driver of a third exemplary embodiment of a display device according to the present invention.
Figure 11A:
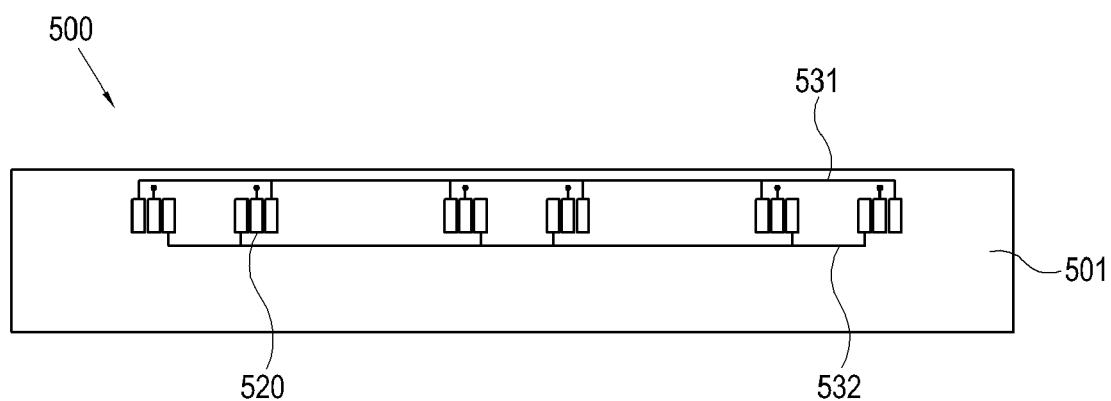
FIG. 11A illustrates a top plan schematic diagram view of a first surface of another exemplary embodiment of a connection circuit substrate of the third exemplary embodiment of a display device according to the present invention.
Figure 11B:
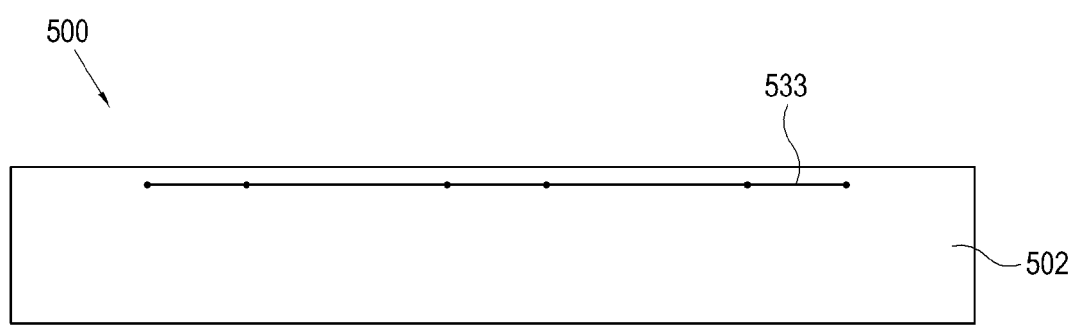
FIG. 11B illustrates a top plan schematic diagram view of a second surface of the exemplary embodiment of a connection circuit substrate illustrated in FIG. 11A.

Referring to FIGS. 10, 11A and 11B, a display device 1 according to a third exemplary embodiment of the present invention will now be described.

FIG. 10 illustrates a top plan schematic diagram of view of a second surface 402 of another exemplary embodiment of a gate driver 400 of a third exemplary embodiment of a display device according to the present invention. FIG. 11A illustrates a top plan schematic diagram view of a first surface 501 of another exemplary embodiment of a connection circuit substrate 500 of the third exemplary embodiment of a display device 1 according to the present invention and FIG. 11B illustrates a top plan schematic diagram view of a second surface 502 of the exemplary embodiment of a connection circuit substrate illustrated in FIG. 11A.

As shown in FIG. 10, a single first signal line 440 and two second signal lines 450a and 450b are formed in a gate driver 400. Thus, a connection circuit substrate 500 transmits three types of signals, and includes a double sided circuit substrate.

As shown in FIG. 11A, six substrate pads 520 are provided in connection regions which are provided in a first surface 501 of the connection circuit substrate 500. A first substrate wire 531 which transmits a signal of the first signal line 440 and a second signal line 532 which transmits a signal of the second signal line 450b are provided in the first surface 501.

As shown in FIG. 11B, a third substrate signal line 533 is provided in a second surface 502 in order to transmit a signal of the second signal line 450a. The substrate pad 520 of the first surface 501 and the third signal line 533 of the second surface 502 are electrically connected with each other through the connection circuit substrate 500.

According to another exemplary embodiment, the connection circuit substrate 500 may transmit four or more types of signals. In exemplary embodiments, the connection circuit substrate 500 may include a multiple-layer circuit substrate including at least three layers.

Figure 12:
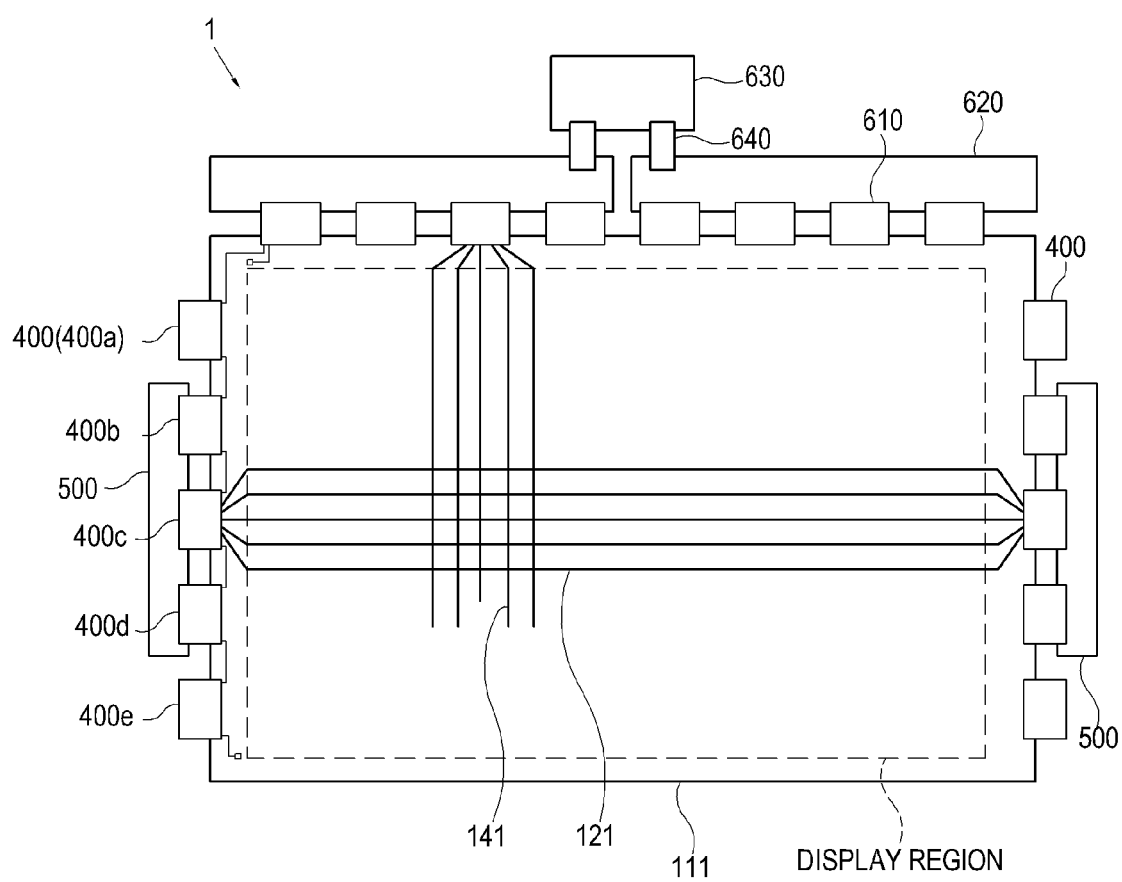
FIG. 12 illustrates a top plan schematic diagram view of an exemplary embodiment of a configuration of a fourth exemplary embodiment of a display device according to the present invention.

Referring to FIG. 12, a display device 1 according to a fourth exemplary embodiment of the present invention will now be described.

FIG. 12 illustrates a top plan schematic diagram view of an exemplary embodiment of a configuration of a fourth exemplary embodiment of a display device 1 according to the present invention.

According to the fourth exemplary embodiment, a part of gate drivers 400 is formed along a right side or an outer region of a first insulating substrate 111. A connection circuit substrate 500 is connected with three of the gate drivers 400 which are formed along the right side or the outer region of the first insulating substrate 111.

According to the fourth exemplary embodiment, the gate driver 400 supplies a gate signal from opposite end parts of the gate line 121, and the gate driver 400 reduces a delay of a gate signal in the gate line 121.

Figure 13:
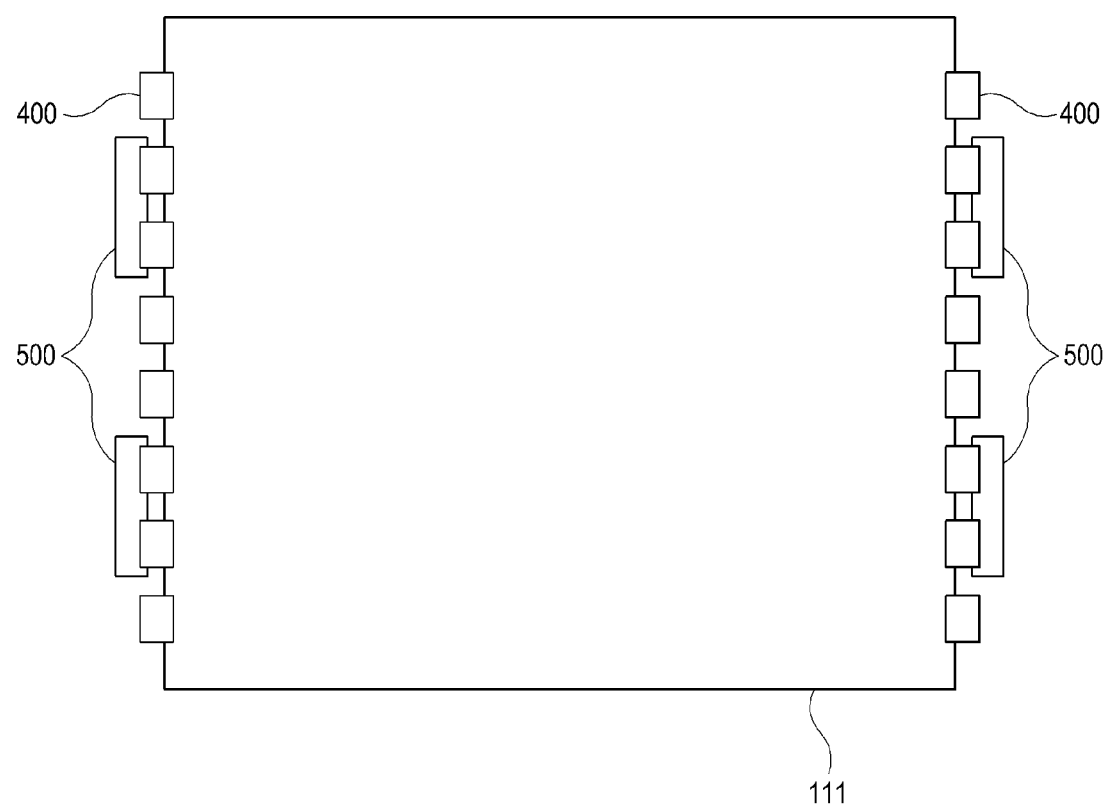
FIG. 13 illustrates a top plan schematic diagram view of an exemplary embodiment of a configuration of a fifth exemplary embodiment of a display device according to the present invention.

Referring to FIG. 13, a display device 1 according to a fifth exemplary embodiment of the present invention will now be described. FIG. 13 illustrates a top plan schematic diagram view of an exemplary embodiment of a configuration of a fifth exemplary embodiment of a display device 1 according to the present invention. FIG. 13 only illustrates a first insulating substrate 111, a gate driver 400 and a connection circuit substrate 500.

As shown in FIG. 13, eight gate drivers 400 are respectively provided on opposite sides of the first insulating substrate 111. There are provided four connection circuit substrates 500, and two connection circuit substrates 500 which are respectively provided on opposite sides of the first insulating substrate 111. The two connection circuit substrates 500 which are respectively provided on the opposite sides of the first insulating substrate 111 are connected with two gate drivers 400.

If a number of the gate drivers 400 increases, an increase in a length of the connection circuit substrate 500 may be controlled by providing two or more connection circuit substrates 500 in one lateral side of the first insulating substrate 111. Meanwhile, signals are efficiently supplied to lower left and right sides of the first substrate 100 by using the connection circuit substrate 500.

As described above, the current exemplary embodiment of the present invention provides a film-chip complex which efficiently transmits a signal.

Also, the current exemplary embodiment of the present invention provides a display device which efficiently transmits a signal.

Although a few exemplary embodiments of the present invention have been shown and described, it will be appreciated by those of ordinary skill in the art that changes may be made in these exemplary embodiments without departing from the principles and spirit of the invention, the scope of which is defined in the appended claims and their equivalents.

What is claimed is:

1. A display device comprising:
    a substrate which includes a gate line and a data line, the gate line intersects with and is insulated from the data line;
    a plurality of film-chip complexes which is attached to a first side of the substrate, and the plurality of film-chip complexes drives the gate line;
    a connection circuit substrate which connects at least two film-chip complexes with each other; and
    a data driver which is attached to a second side of the substrate and the data driver drives the data line, a film-chip complex of the plurality of film-chip complexes comprising:

a film, which includes a first connection region and a second connection region, attached to the substrate;

a chip which is mounted on the film;

a gate signal line which is disposed on the film, the gate signal line comprises a gate lead provided in the first connection region and a gate main line which connects the chip with the gate lead; and a signal line disposed on the film, the signal line comprises signal leads provided in the first connection region, a signal main line extending toward the first connection region and a signal pad connected with the signal main line, wherein the signal pad is provided in the second connection region and is connected with the connection circuit substrate, wherein the connection circuit substrate electrically connects a signal line of respectively connected film-chip complexes of the plurality of film-chip complexes, wherein the film-chip complexes comprise a connection film-chip complex which is connected with the connection circuit substrate, and a non-connection film-chip complex which is not directly connected with any connection circuit substrates, and wherein the first connection region faces the second connection region with reference to the chip.

2. The display device according to claim 1, wherein the connection circuit substrate comprises a substrate pad which corresponds to the signal pad, and a substrate wire which connects the substrate pad to another substrate pad.

3. The display device according to claim 1, wherein the respectively connected film-chip complexes further comprise an insulating member which covers the gate main line and the signal main line, and the insulating member exposes the signal pad, the signal lead and the gate lead.

4. The display device according to claim 1, wherein the signal pad includes a larger width than a width of the signal main line.

5. The display device according to claim 1, wherein the signal line is spaced from the chip, the signal leads are provided on both ends of the signal main line and the gate lead is disposed between the signal leads.

6. The display device according to claim 1, wherein the chip is disposed between the signal pad and the first connection region.

7. The display device according to claim 1, wherein the film-chip complex comprises:

a first signal line which is spaced from the chip; and a second signal line which is connected with the chip, wherein signal leads of the first signal line are provided on both ends of a first signal main line and a lead of the second signal line is disposed between the signal leads of the first signal line.

8. The display device according to claim 1, wherein the substrate further comprises a first connection wire which transmits a gate driving signal from the data driver to the plurality of film-chip complexes.

9. The display device according to claim 1, wherein at least one of a common voltage Vcom, a gate on voltage Von, a gate off voltage Voff, a power voltage Vdd and a ground voltage Vgnd is transmitted through the connection circuit substrate.

10. A display device comprising:

a substrate comprising a gate line and a data line;

a plurality of film-chip complexes attached to a first side of the substrate, the plurality of film-chip complexes driving the gate line;

a connection circuit substrate connecting at least two film-chip complexes with each other; and a data driver attached to a second side of the substrate, the data driver driving the data line, wherein the connection circuit substrate electrically connects a signal line of respectively connected film-chip complexes of the plurality of film-chip complexes, and wherein the film-chip complexes comprise a connection film-chip complex which is connected with the connection circuit substrate, and a non-connection film-chip complex which is not directly connected with any connection circuit substrates.

* * * * *